Sept. 24, 1940.  R. DOCZEKAL  2,215,497
ENERGY PRODUCING PROCESS
Filed June 21, 1938
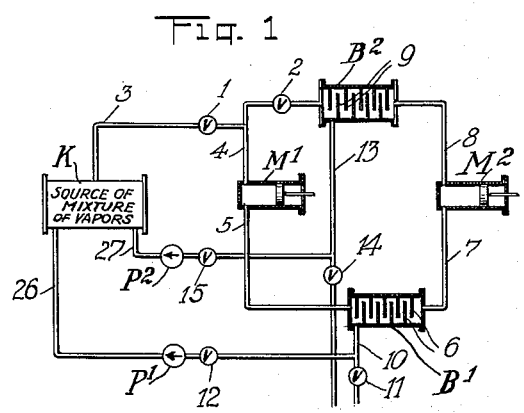
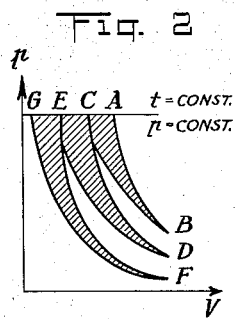
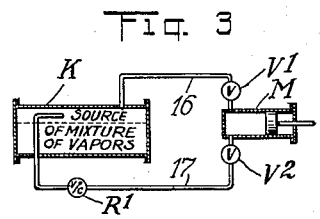
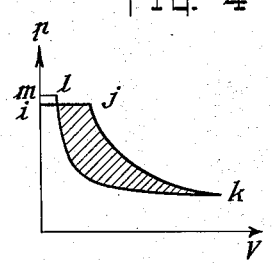
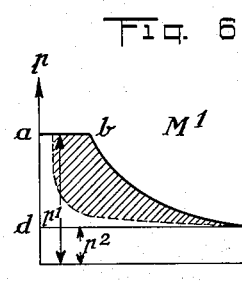
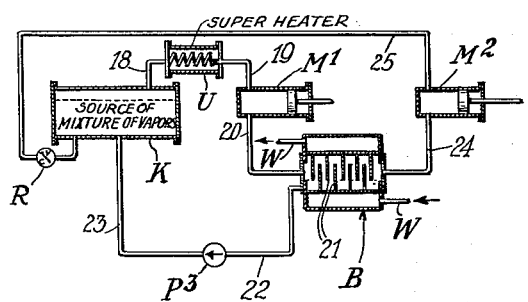
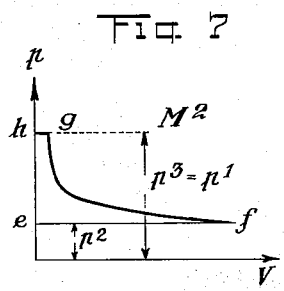
INVENTOR.
RUDOLF DOCZEKAL
BY
ATTORNEY.

Patented Sept. 24, 1940

2,215,497

UNITED STATES PATENT OFFICE 2,215,497

ENERGY PRODUCING PROCESS

Rudolf Doczekal, Vienna, Germany

Application June 21, 1938, Serial No. 215,065
In Austria October 16, 1937

15 Claims. (Cl. 60—39)

My invention relates to a method of utilizing vapors, and more particularly to a method of utilizing a mixture of vapors of a plurality of liquids being insoluble or only partially soluble one in the other, such as a mixture of the vapors of water and one or more hydrocarbons, or a mixture of vapors of liquids showing a maximum and a minimum boiling point.

One object of my invention is to provide a method, by means of which energy may be produced with such a mixture of vapors without loss of heat due to condensation by cooling means.

Another object of my invention is to provide a method, by means of which a mixture of vapors of a plurality of liquids being insoluble or only partially soluble one in the other may be separated into its components in liquid state without the use of cooling means.

A further object of my invention is to provide a method, by means of which energy is produced during the transformation of at least a portion of the mixture of vapors into a liquid state.

In order to carry out my invention into practice, I provide a method comprising the steps of expanding the mixture of vapors of a plurality of liquids of the above described type in a heat engine producing energy and simultaneously transforming at least a portion of at least one component of the mixture of vapors into a liquid state, and subsequently compressing the remainder of the mixture of vapors in a compressor and simultaneously transforming at least a portion of at least one other component of the mixture of vapors into a liquid state.

The above objects as well as others not particularly pointed out will appear from the following description with reference to the accompanying drawing, in which:

Fig. 1 is a diagrammatic view of a plant for separating a mixture of vapors into its components in liquid state and for producing energy, Fig. 2 is a P.-V. diagram illustrating the energy produced during the expansion and compression of a mixture of vapors in the plant shown in Fig. 1, Fig. 3 is a diagrammatic view of another embodiment of a plant for producing energy, Fig. 4 is a P.-V. diagram relating to the plant shown in Fig. 3, Fig. 5 is a diagrammatic view of a further embodiment of a plant for producing energy, and Figs. 6 and 7 are two P.-V. diagrams relating to the plant shown in Fig. 5.

For the sake of simplification, it may be assumed that the mixture of vapors used in the plants shown in the drawing consists of two components only, although the mixture may consist of three or more components, if desired. For example, the mixture of vapors may be formed by the evaporation of two liquids being insoluble or only partially soluble one in the other, such as water and a hydrocarbon. Said hydrocarbon may be benzol, for example.

The above described mixture of vapors shows the feature, that its composition is clearly dependent upon the temperature, i. e., that the ratio of the mixture will change in dependence upon the temperature. By expanding such a mixture of vapors, composed for example of the two components water and benzol, in a closed cylinder, the original composition of the mixture of vapors will change in dependence on the temperature falling during the expansion. For example, if a certain amount by weight of a mixture of the vapors of water and benzol is introduced into a cylinder, the amount by weight of the evaporated water component in the mixture of the vapors is higher at the initial high temperature than at the final low temperature after the expansion. As the weight of the contents of the cylinder is not changed during the expansion and as the amount by weight of the evaporated water component in the mixture of the vapor must be reduced during the expansion, a portion of the water component of the mixture equal to the difference between the initial amount by weight and the final amount by weight of the evaporated water component is condensed during the expansion, so that at the end of the expansion the cylinder contains a portion of the water component in liquid state and the remainder of the mixture of vapors of water and benzol. On the other hand, if, after the removal of the liquid water component, the remainder of the mixture of the vapors of water and benzol is introduced into the cylinder of a compressor and is compressed therein to a higher pressure at a higher temperature, a portion of the benzol component is condensed during the compression, as the amount by weight of the benzol component in the mixture of vapors is higher at the low temperature than at the high temperature after the compression. The cylinder of the compressor contains a portion of the benzol component in liquid state and the remainder of the mixture of vapors of water and benzol. Thus, the benzol may be partially condensed by compression. If the expansions and compressions are repeated, and, if, after every expansion and compression respectively, the portion of the respective component transformed into a liquid state is removed, the mixture of vapors may be entirely separated into its components in liquid state. Furthermore, it has been found, that the work done during the compression is less than the work done during the expansion, so that energy may be produced when the components of the mixture of vapors are transformed into their liquid state.

Fig. 1 illustrates a plant, by means of which a mixture of vapors may be separated into its components in liquid state. The vessel K contains a mixture of vapors, for example a mixture of the vapors of the two components water and benzol, at a certain pressure and a certain temperature. A certain amount of said mixture of vapors is conducted through the line 3, through the valve 1 being open at this time, and through the line 4 into the cylinder of a heat engine $M_1$, in which said amount of the mixture of vapors is expanded according to the curve A—B of the diagram shown in Fig. 2. The heat engine $M_1$ produces energy during said expansion of the mixture of vapors. The temperature at the point B is lower than the temperature at the point A, so that a portion of one component (water) of the mixture of vapors is condensed during the expansion. At the end of the expansion, the liquid portion of said water component is still mixed with the remainder of the mixture of the vapors of water and benzol. During the return stroke of the piston of the heat engine $M_1$ the liquid portion of said water component and the remainder of the mixture of vapors is discharged through the line 5 into the separator $B_1$ equipped with baffle plates 6. During the movement of the substances through the separator $B_1$, the liquid portion of the water component is separated from the remainder of the mixture of vapors and accumulates in the separator $B_1$. The remainder of the mixture of vapors, the weight of which being lessened by the quantity of water condensed, is sucked into the cylinder of a compressor $M_2$ through the line 7. During the return stroke of the piston of the compressor the remainder of the mixture of vapors is compressed and thereby heated to the same temperature that prevails in the vessel K. The curve B—C of Fig. 2 indicates said compression. During said compression, a portion of the other component (benzol) of the mixture of vapors is condensed, as the temperature at the point C equal to the temperature at the point A is higher than the temperature at the point B. At the end of the compression the liquid portion of said benzol component is still mixed with the remainder of the mixture of the vapors of water and benzol. The substances are discharged from the compressor $M_2$ through the line 8 into the separator $B_2$ equipped with baffle plates 9, in which the liquid portion of the benzol component separated from the remainder accumulates. Assuming the valve 2 to be open and the valve 1 closed, the remainder of the mixture of vapors, the weight of which now being lessened by the quantity of water separated in the separator $B_1$ and by the quantity of benzol separated in the separator $B_2$, is introduced into the heat engine $M_1$, and the cycle of expansions and subsequent compressions with separation of the condensed portions of the components may be continued until for the most part the mixture of vapors has been separated into its two components in liquid state. A new cycle may begin after a fresh amount of the mixture of vapors has been admitted from the vessel K through the line 3 and the opened valve 1 into the heat engine $M_1$. The accumulated amount of liquid water may be discharged from the separator $B_1$ through the line 10 after opening the valve 11 and closing the valve 12 to be described later on. Likewise, the accumulated amount of liquid benzol may be discharged from the separator $B_2$ through the line 13 after opening the valve 14 and closing the valve 15 to be described later on. Fig. 2 illustrates the curves of expansion and compression for three cycles; A—B—C is the first cycle, C—D—E is the second cycle, and E—F—G is the third cycle. Each curve of compression differs from each curve of expansion, so that during each cycle energy is produced. The net work done in the plant during the three-cycled separation of said certain amount of the mixture of vapors into its components is indicated in Fig. 2 by the hatched surfaces. Each cycle differs from the preceding one due to the different quantities by weight of the mixture of vapors supplied to the heat engine and the compressor after the separation of the condensed portions of its components.

The above described method reduces the mixture of vapors into a liquid state and separates its components from each other. For the purpose not of separating the mixture of vapors of suitable pressure and of suitable temperature into its components but of reducing it suitably into a liquid state, combined with the production of energy, by successive expansions and compressions, there will finally result a reduction of the mixture of vapors to the liquid state, if desired at the initial temperature, over a suitably selected range, for instance according to the lines ABCDEFG (Fig. 2). In other words, in such a case the separators $B_1$ and $B_2$ of the plant shown in Fig. 1 would be omitted, and the heat engine and compressor would be directly connected with each other, whereby the liquid portion of the respective component condensed during the expansion or compression respectively remains in the medium supplied to the heat engine $M_1$ and compressor $M_2$, until substantially the entire amount of the mixture of vapors is liquefied. The liquid discharged from the compressor in any suitable manner after completion of the cycles of expansion and compression is at the initial temperature and consists of a mixture of the components.

Fig. 3 illustrates a plant for the production of energy by means of a mixture of vapors in a closed cycle, without the special aim of obtaining the components of the mixture in liquid state and using same for any other purpose. A mixture of liquids being insoluble or only partially soluble one in the other, for example a mixture of water and a hydrocarbon, is evaporated under pressure in the boiler K. The mixture of vapors thus obtained is conducted through the line 16 and the valve $V_1$ into the cylinder of the engine M, wherein it is expanded. During said expansion, a portion of one component (water) of the mixture of vapors is condensed in the cylinder. The liquid portion of the water component remains in the medium. During the subsequent compression of the remainder of the mixture of vapors in the cylinder of the engine M, a portion of the other component (hydrocarbon) of the mixture of vapors is condensed. The liquid portion of the benzol component also remains in the medium. The liquid portions of the two components and the remainder of the mixture of vapors are expelled by the piston of the engine M through the opened valve $V_2$ and the line 17, in which a check-valve R₁ may be inserted, into the boiler K, wherein they are again heated. Fig. 4 represents the diagram of this method. The pressure 1 at the end of the compression is somewhat higher than the pressure $i$ prevailing in the boiler K, so that the remainder of the mixture of the vapors mixed with the liquid portions of its components may be forced back into the boiler K.

While Fig. 3 shows a plant, in which one and the same engine M acts as energy producing engine and as compressor, Fig. 5 illustrates a different embodiment of a plant for the production of energy, in which two separate engines, a heat engine M₁ and a compressor M₂, are provided. The mixture of liquids being insoluble or only partially soluble one in the other, for example water and a hydrocarbon, is evaporated under pressure in the boiler K. The mixture of vapors thus obtained is led through a line 18 into a suitable superheated U delivering the superheated mixture of vapors through the line 19 to the heat engine M₁. During the expansion in the heat engine M₁ from the pressure $p1$ to the pressure $p2$, the mixture of vapors does the work represented in the P.-V. diagram according to Fig. 6. The portion of one component (water) of the mixture of vapors condensed during the expansion as well as the remainder of the mixture of vapors are discharged through the line 20 into the separator B, in which the liquid portion of the water component separated from the remainder of the mixture of vapors by the baffle plates 21 accumulates. If desired, the remainder of the mixture of vapors may be subjected to an auxiliary cooling for the purpose of partially or totally condensing the vapor after the expansion and prior to the compression. In such a case, a cooling means flowing in the line W is conducted through the separator B. The liquid portion of the water component accumulated in the separator B is fed back to the boiler K by means of a pump P₃ connected with the separator and the boiler by the lines 22 and 23 respectively. The remainder of the mixture of vapors being under the pressure $p2$ is sucked from the separator B through the line 24 into the cylinder of a compressor M₂, in which it is compressed to the pressure $p3$ (compare diagram line $efgh$ in Fig. 7). During the compression a portion of the other component (hydrocarbon) of the mixture of vapors is condensed and remains in the medium. Said liquid portion of the hydrocarbon component as well as the remainder of the mixture of vapors are fed back from the compressor M₂ through the line 25 provided with a check-valve R into the boiler K. The net work done in the plant according to Fig. 5 is indicated in Fig. 6 by the hatched surface.

Fig. 5 illustrates a plant for producing energy, which has only one separator between the heat engine and the compressor for separating the water component from the remainder of the mixture of vapors. If desired, however, a second separator may be provided in the plant, in which the hydrocarbon component may be separated from the remainder of the mixture of vapors. Such a plant for producing energy is also illustrated by Fig. 1. In order to use the plant according to Fig. 1 for the production of energy without using the separated liquid portion of the two components for any other purpose, the valves 11 and 14 are permanently closed, and the valves 12 and 15 are opened. The mixture of vapors obtained in the boiler K is conducted through the lines 3 and 4 into the heat engine M₁ producing energy. The liquid portion of the water component and the remainder of the mixture of vapors is supplied to the separator B₁ through the line 5. The water accumulated in the separator B₁ is fed back to the boiler K by means of the pump P₁ connected with the boiler through the line 26. The remainder of the mixture of vapors is led from the separator B₁ through the line 7 into the compressor M₂. The liquid portion of the benzol component and the remainder of the mixture of vapors flow from the compressor M₂ through the line 8 into the second separator B₂. The benzol accumulated therein is fed back to the boiler K by means of the pump P₂ connected with the boiler by the line 27. The remainder of the mixture of vapors is admitted to the heat engine M₁ through the line 4, and an additional fresh amount of the mixture of vapors is supplied to the line 4 from the line 3 connected to the boiler K. The liquid portions of the two components returned into the boiler K by the pumps P₁ and P₂ are evaporated again in this boiler by heating them.

Although the drawing shows only one heat engine and only one compressor, the method according to the invention could be carried out in several heat engines and/or several compressors. Furthermore, instead of the piston-engines shown in the drawing, turbo-engines could be used, if desired. Moreover, the superheater shown in Fig. 5 may be omitted in this embodiment or may be used in any one of the embodiments shown in Figs. 1 and 3.

I have described preferred embodiments of my invention, but it is clear that numerous changes and omissions may be made without departing from the spirit of my invention.

What I claim is:

1. A method of utilizing a mixture of vapors of a plurality of liquids being insoluble or only partially soluble one in the other, comprising the steps of expanding the mixture of vapors in a heat engine producing energy and simultaneously transferring at least a portion of at least one component of the mixture of vapors into a liquid state, and subsequently compressing the remainder of the mixture of vapors in a compressor and simultaneously transforming at least a portion of at least one other component of the mixture of vapors into a liquid state.

2. A method as claimed in claim 1, in which, after the compression, the expansion and compression of the remainder of the mixture of vapors are repeated.

3. A method as claimed in claim 1, in which, after the compression, the expansion and compression of the remainder of the mixture of vapors are repeated, until the components of the mixture of vapors are substantially entirely transformed into their liquid state.

4. A method of utilizing a mixture of vapors of a plurality of liquids being insoluble or only partially soluble one in the other, said mixture being at a certain original pressure and temperature, comprising the steps of expanding the mixture of vapors in a heat engine producing energy and simultaneously transforming at least a portion of at least one component of the mixture of vapors into a liquid state, and subsequently compressing the remainder of the mixture of vapors in a compressor to the original pressure at the original temperature and simultaneously transforming at least a portion of at least one other component of the mixture of vapors into a liquid state.

5. A method of separating a mixture of vapors of a plurality of liquids being insoluble or only partially soluble one in the other, into its components in liquid state, comprising the steps of introducing the mixture of vapors into a heat engine, expanding the mixture of vapors in said heat engine producing energy and simultaneously transforming at least a portion of at least one component of the mixture of vapors into a liquid state, separating the liquid, thus obtained in the heat engine, from the remainder of the mixture of vapors, leading the remainder of the mixture of vapors into a compressor, compressing the remainder of the mixture of vapors in said compressor simultaneously transforming at least a portion of at least one other component of the mixture of vapors into a liquid state, and separating the liquid, thus obtained in the compressor, from the remainder of the mixture of vapors.

6. A method of separating a mixture of vapors of a plurality of liquids being insoluble or only partially soluble one in the other into its components in liquid state, comprising the steps of leading a predetermined amount of the mixture of vapors at a certain original pressure and temperature from a supply vessel into a heat engine, expanding said amount of the mixture of vapors in said heat engine producing energy and simultaneously transforming at least a portion of at least one component of the mixture of vapors into a liquid state, separating the liquid, thus obtained in the heat engine, from the remainder of the mixture of vapors, leading the remainder of the mixture of vapors into a compressor, compressing the remainder of the mixture of vapors in said compressor simultaneously transforming at least a portion of at least one other component of the mixture of vapors into a liquid state, separating the liquid, thus obtained in the compressor, from the remainder of the mixture of vapors, returning the remainder of the mixture of vapors into said heat engine, and repeating the expansions and compressions, until the amount of the mixture of vapors is substantially entirely separated into its components in liquid state.

7. A method as claimed in claim 6, in which during each compression the remainder of the mixture of vapors is compressed to the original pressure at the original temperature.

8. A method of producing energy, comprising the steps of evaporating in a boiler a mixture of a plurality of liquids being insoluble or only partially soluble one in the other, expanding and subsequently compressing the mixture of vapors thus obtained in at least one engine, thereby producing energy and transforming at least a portion of at least one component of the mixture of vapors into a liquid state during the expansion and transforming at least a portion of at least one other component of the mixture of vapors into a liquid state, during the compression, and returning the liquid components into the boiler.

9. A method of producing energy as claimed in claim 8, in which the mixture of vapors is superheated prior to the expansion.

10. A method of producing energy as claimed in claim 8, in which the mixture of vapors is cooled after the expansion.

11. A method of producing energy as claimed in claim 8, in which the mixture of vapors is superheated prior to the expansion and is cooled after the expansion.

12. A method of producing energy, comprising the steps of evaporating in a boiler a mixture of a plurality of liquids being insoluble or only partially soluble one in the other, leading the mixture of vapors thus obtained into the cylinder of an engine, expanding the mixture of vapors in the cylinder of said engine producing energy and simultaneously transforming at least a portion of at least one component of the mixture of vapors into a liquid state, subsequently compressing the remainder of the mixture in said cylinder of said engine and simultaneously transforming at least one other component of the mixture of vapors into a liquid state, and conducting the liquid components and the remainder of the mixture of the vapors from said cylinder into said boiler.

13. A method of producing energy, comprising the steps of evaporating in a boiler a mixture, of a plurality of liquids being insoluble or only partially soluble one in the other, leading the mixture of vapors thus obtained into a heat engine, expanding the mixture of vapors in said heat engine producing energy and simultaneously transforming at least a portion of at least one component of the mixture of vapors into a liquid state, conducting the remainder of the mixture of vapors and the liquid component into a separator and separating therein the liquid component from the remainder of the mixture of vapors, returning the liquid component from said separator into said boiler, leading the remainder of the mixture of vapors from said separator into a compressor, compressing the remainder of the mixture of vapors in said compressor and simultaneously transforming at least a portion of at least one other component of the mixture of vapors into a liquid state, and conducting the remainder of the mixture of vapors and the liquid component obtained in the compressor from the compressor into said boiler.

14. A method of producing energy, comprising the steps of evaporating in a boiler a mixture, of a plurality of liquids being insoluble or only partially soluble one in the other, leading the mixture of vapors thus obtained into a heat engine, expanding the mixture of vapors in said heat engine producing energy and simultaneously transforming at least a portion of at least one component of the mixture of vapors into a liquid state, conducting the remainder of the mixture of vapors and the liquid component into a first separator and separating therein the liquid component from the remainder of the mixture of vapors, returning the liquid component from said separator into said boiler, leading the remainder of the mixture of vapors from said first separator into a compressor, compressing the remainder of the mixture of vapors in said compressor and simultaneously transforming at least a portion of at least one other component of the mixture of vapors into a liquid state, conducting the remainder of the mixture of vapors and the liquid component obtained in the compressor from the compressor into a second separator and separating therein the liquid component from the remainder of the mixture of vapors, returning the liquid component separated in the second separator from the second separator into the boiler, and leading the remainder of the mixture of vapors from the second separator into the heat engine.

15. A method of producing energy, comprising the steps of evaporating in a boiler a mixture of a plurality of liquids being insoluble or only partially soluble one in the other, leading a predetermined amount of the mixture of vapors thus obtained into a heat engine, expanding said amount of the mixture of vapors in said heat engine producing energy and simultaneously transforming at least a portion of at least one component of the mixture of vapors into a liquid state, conducting the remainder of said amount of the mixture of vapors and the liquid component into a first separator and separating therein the liquid component from the remainder of the mixture of vapors, returning the liquid component from said separator into said boiler, leading the remainder of said amount of the mixture of vapors from said first separator into a compressor, compressing the remainder of said amount of the mixture of vapors in said compressor and simultaneously transforming at least a portion of at least one other component of the mixture of vapors into a liquid state, conducting the remainder of said amount of the mixture of vapors and the liquid component obtained in the compressor from the compressor into a second separator and separating therein the liquid component from the remainder of said amount of the mixture of vapors, returning the liquid component separated in the second separator from the second separator into the boiler, returning the remainder of said amount of the mixture of vapors from the second separator into the heat engine, expanding and subsequently compressing the remainder of said amount of the mixture at least a second time in said heat engine and said compressor, whereupon a fresh amount of the mixture of vapors is supplied to said heat engine from said boiler.

RUDOLF DOCZEKAL.